July 8, 1952 — M. M. FROMM ET AL — 2,602,829
INORGANIC ROPE IMPREGNATED WITH RESIN
AND COILS BLOCKED THEREWITH
Filed Sept. 2, 1950

WITNESSES:
H. F. Susser
Nw. C. Groome

INVENTORS
Marvin M. Fromm
and John S. Johnson.
BY Frederick Shapoe
ATTORNEY

Patented July 8, 1952

2,602,829

UNITED STATES PATENT OFFICE 2,602,829

INORGANIC ROPE IMPREGNATED WITH RESIN AND COILS BLOCKED THEREWITH

Marvin M. Fromm, Greensburg, and John S. Johnson, Pittsburgh, Pa., assignors to Westinghouse Electric Corporation, East Pittsburgh, Pa., a corporation of Pennsylvania Application September 2, 1950, Serial No. 183,048

5 Claims. (Cl. 171—252)

This invention relates to electrical apparatus having a plurality of coils and a resin impregnated inorganic fiber rope member for blocking the coils with respect to each other.

In electrical apparatus of high capacity, such as power plant generators, there occurs the normal flow of heavy amperage electrical currents through the coils and their end windings. At times, due to surges, exceptionally high amperage electrical currents may flow. Such high amperage currents produce powerful magnetic fields which cause the attraction or repulsion of the end windings of the coils for each other whereby considerable stresses are applied to the end windings. Since the physical dimensions of the end windings increase with the size and capacity of the machine, the deformation of the end windings by these magnetically induced stresses increases very greatly with increase in size of the electrical apparatus and, therefore, considerably greater protection such as bracing and blocking is necessary to prevent the coils and end windings from being deformed to the place where actual damage occurs. In machines of the size of 10,000 kva. and larger, a considerable amount of time is necessary to block, space and bind the end windings into a relatively rigid end winding unit capable of resisting the normal loads and the unavoidable overloads that may be imposed on the machine.

The half coils for the larger electrical machines usually have complex-curved end windings, and due to the unavoidable difference in size, shape and length of each of the coils, the end windings do not form a perfect pattern. There are small but substantial variations in the fit of the end windings. Thus where a nominally one inch space should be present between successive end windings of coils 8 feet and larger, at a given point, the space may actually vary from 1¼ to ¾ inches, or even more between various coils. Thus solid spacer blocks of one inch thickness can be applied to each such space to fit snugly between the coils only by the expenditure of considerable labor in fitting, springing, tieing and otherwise forcing the end windings into a more uniform assembly.

In many cases, hundreds of man hours are required to properly brace and block the end windings. In large machines, many hundreds of wedges and blocks must be placed between the end windings and numerous ties applied to enable them to withstand normally expected electrical loads.

The object of this invention is to provide for blocking end windings of coils rapidly and efficiently by means of an inorganic fiber rope member impregnated with a thermosettable resin.

Another object of the invention is to provide a process for blocking the end windings of the coils by forcing between adjacent spaced end windings an inorganic fiber rope member impregnated with a fluid thermosettable resin curable at room temperature to provide a solid blocking structure within the spaces in the end windings.

A still further object of the invention is to provide a rope-like member composed of a rope of inorganic fibrous material impregnated with a liquid completely reactive thermosettable resin.

Other objects of the invention will in part be obvious and will in part appear hereinafter.

For a better understanding of the nature and objects of the present invention, reference may be had to the following detailed description and drawing in which.

Figure 1:
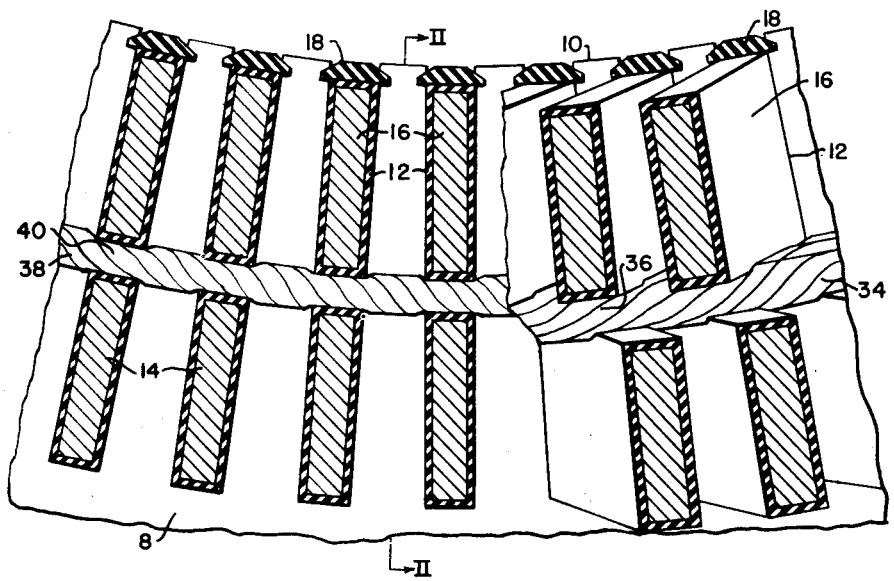
Figure 1 is a fragmentary cross-sectional view through a generator.
Figure 2:
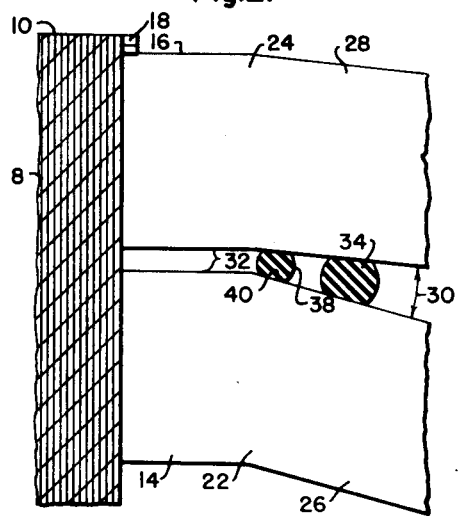
Fig. 2 is a cross-section on line II—II of Fig. 1.

Referring to Fig. 1 of the drawing, there is illustrated a portion of an electrical machine, such, for example, as the stator of an alternating current generator. The stator comprises a magnetic core 8 composed of a plurality of laminations of magnetic material formed with a circular bore 10 into which a rotor will fit, and into which bore 10 open coil receiving slots 12 formed in the core 8. The entire periphery of the bore 10 is faced with these regularly spaced slots 12. Within each slot 12 is disposed a lower coil 14 and an upper coil 16 held in place by a wedge or slot stick 18.

Figure 3:
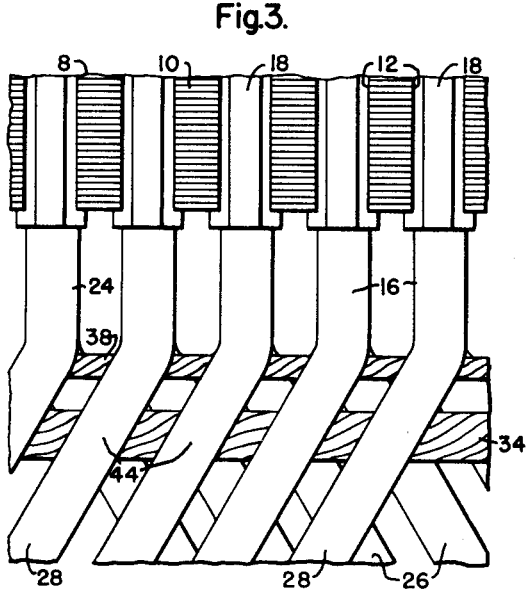
Fig. 3 is a fragmentary plan view of the structure of Fig. 1.

Referring to all three figures of the drawing, it will be noted that both the upper and lower coils 14 and 16, extend straightforwardly from the slot portions in slots 12 for a short distance. At point 22, the lower coil 14 is bent downwardly and to the right as viewed in Figure 3 to form an end winding 26, while at point 24 the upper coil 16 is bent downwardly somewhat less than end winding 26, and to the left as viewed in Fig. 3, to form an end winding 28. It will be observed in Figure 3 that the end windings 26 and 28 from adjacent coils cross over each other at 44, a short distance beyond point 24. Due to the difference in the angle between the end windings 26 and 28 with respect to the slot portion of the coils 14 and 16 a diverging angular separation or space 30 is formed which reaches a minimum distance 32 at points 22—24. The angular separation 30 forms a deep wedge-shaped space at the cross-over point 44 of adjacent end windings 26—28, and a narrower wedge-shaped space at points 22—24. The wedge-shaped space at points 22—24 may be about ¼ inch in a large machine. The wedge-shaped space at the cross-over point 44 of the end windings 26—28 may be from about ½ inch to 1 inch or even more.

It is necessary that each of the end windings 26 and 28 be blocked with respect to each other close to the cross-over point 44. If desired blocking may be done at the points 22 and 24 as well, or at any other point. The customary prior art practice was to insert individual wedges or blocks between the upper and lower end windings 26 and 28 of each slot at or near each of the cross-over points 44. Each of these wedges had to be fitted, the end windings sprung to accommodate the wedges, and tied manually. For a machine of 50,000 kva. capacity and higher, over 60 hours of labor has been normally required to block all of the coils at these points 44 alone.

In accordance with the present invention, we are able to dispense entirely with individual wedges and have produced highly satisfactory blocking of the end windings 26—28 at the cross-over points 44 or at points 22—24 by forcing into the wedge-shaped space 30 one or more rope-like members normally of a size slightly larger than the space at which the blocking is to be effected. This rope-like member comprises a bundle of inorganic fibers in the shape or form of a rope, the member being impregnated with a liquid resinous composition capable of thermosetting substantially completely at room temperature in a matter of hours.

It will be noted that the plurality of spaces 30 are arrayed circularly concentric with the bore 10. A single rope-like member 34 having a length to completely reach around this entire space is introduced into this circular array of wedge-shaped spaces 30 near the cross-over points 44. The rope-like member 34 is stretched through all the spaces 30 and is forced or driven in between the end windings 26 and 28 so that the rope-like member is compressed between the end windings into a relatively compressed portion 36 as shown in Fig. 1 of the drawing. Between successive coils or end windings, the rope member, being uncompressed, will exhibit slight bulges. We have found that a bar having an end of substantially the size of the space to be wedged or blocked by the rope member may be employed to drive in the rope member 34 into the wedge shaped spaces. A few moderate taps or blows of such a bar are enough to force in the rope-like member solidly at each pair of cross-over points 44. The slot-sticks or wedges 18 will prevent undue springing of the individual coils 14 and 16 while the member 34 is being so driven in place.

For a more rigid blocking, a smaller resin impregnated rope 38 may be first driven in at points 22—24 to form compressed portions 40, and then the member 34 driven in. By the application of suitable impregnating compositions, as will be disclosed, both of the rope-like members after being wedged in place will have the resin composition impregnated therein cured to a thermoset state in several hours. Once the resinous composition has cured to a solid, the members 34 and 38 will be converted to a solid body capable of withstanding any compressive stresses that will be generated during service. The impregnating resin having thermoset, the member 34 is rigidly fixed between the end windings 26 and 28. No ties or other binding are required. We have introduced a rope member such as 34 into all the spaces 30 of a dynamoelectric machine in a matter of less than two hours. The economies resulting from practice of the present invention accordingly are very material. Furthermore end-windings need not be sprung to meet solid wedges as heretofore required, since the rope member will readily accommodate wide differences in spacing.

The rope-like member 34 employed in practicing the invention comprises a body of inorganic fibers, either glass fibers or asbestos fibers or a mixture of both. We have secured good results by employing asbestos rope. The asbestos fibers may be twisted, braided or otherwise formed into a rope-like member. A braided rope is particularly advantageous because it is compact, does not ravel, and holds its body when being handled and driven in place. The rope may be circular or square or even wedge shaped in cross-section if desired. It should be understood that the rope of inorganic fibers should be so formed as to be relatively firm, compact and mechanically strong to provide for proper results.

The rope of inorganic fibrous material is impregnated in a liquid completely reactive resinous composition that is thermosettable at room temperature. The reason for the last requirement is that in the large electrical machines for which the invention is most advantageous, it is most difficult to heat the magnetic core and the applied coils due to handling problems and the possibility of damage to the machine. The liquid resinous compositions to be used preferably comprise one or more compounds having unsaturated groups capable of vinyl-type addition polymerization. We have secured particularly good results by employing a solution comprising a liquid monomeric compound having the group $H_2C=C<$, in which is dissolved an unsaturated polyester having the group $>C=C<$. Particularly good results have been secured by employing as the polyester resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a substantially molar equivalent of one or more polyhydric alcohols such as ethylene glycol, glycerol, propylene glycol, diethylene glycol, or pentaerythritol or mixtures thereof. Castor oil has been employed successfully in an esterification reaction with maleic anhydride. The resultant ester, such as castor oil maleate ester, is admixed with a polymerizable unsaturated monomer, for example, monostyrene, in the proportions of from 10 to 95 parts by weight of the monostyrene and from 90 to 5 parts by weight of the ester.

In the preparation of the unsaturated alkyd esters, an ethylenically unsaturated alpha-beta dicarboxylic acid or anhydride may be replaced with up to 95% of the weight thereof by a saturated aliphatic dicarboxylic acid or aryl dicarboxylic acid or anhydride, such, for example, as succinic acid, adipic acid, sebacic acid, phthalic acid, phthalic anhydride or the like. In some instances, epoxides have been employed in lieu of glycols, particularly in reactions with dicarboxylic acids instead of their anhydrides.

The unsaturated alkyd esters are dissolved in a liquid unsaturated monomer having the group $H_2C=C<$. Suitable liquid unsaturated polymerizable monomers are: monostyrene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

An excellent completely reactive composition is one composed of a solution of from 90 to 50 parts of arylalkene polymerizable monomer of from 10 to 50 parts by weight of the alkyd reaction products of (A) an unsaturated acidic compound from the group consisting of maleic acid, maleic anhydride, fumaric acid, citraconic acid and citraconic anhydride in admixture with one or more saturated straight chain dicarboxylic acids having the carboxyl groups disposed at the end of the straight chain, the chain having from 2 to 10 non-carboxyl carbon atoms and no other reactive groups, and (B) a molar equivalent within ±10% of an aliphatic saturated glycol having no other reactive group than the hydroxyl groups. The proportion of the unsaturated acidic compound in the mixture of acids should be between 5% and 50% of the weight of the mixture. Suitable saturated dicarboxylic acids are adipic acid, sebacic acid, azelaic acid, suberic acid, succinic acid, decamethylene dicarboxylic acid and diglycolic acid and mixtures thereof. With the longer chain saturated dicarboxylic acids, as, for example, sebacic acid, the proportion of maleic anhydride, for example, may be higher than if the saturated acid were all succinic acid, if cured products of similar degrees of hardness are desired. Suitable glycols for reaction with the mixture of saturated and unsaturated acids are ethylene glycol, propylene glycol, diethylene glycol, 1,5-pentanediol and triethylene glycol. Mixtures of the glycols are suitable for producing the reaction product. The reaction of the (A) acidic compounds and (B) the glycols may be carried out by heating in a reaction vessel at temperatures of from 100° C. to 250° C. for from 24 hours to 2 hours to a low acid number of below 60.

The following are specific examples of the preparation of the unsaturated alkyd reaction products to be dissolved in the vinyl aryl monomer.

*Example I*

A mixture of 44 mole percent of adipic acid and 6 mole percent of fumaric acid was combined with 50 mole percent of propylene glycol and reacted with $CO_2$ sparging for about 4 hours at 140° C. in a closed reaction vessel after which the temperature was raised to 220° C. over a 4-hour period and the reaction was continued at 220° C. for 8 hours. A syrupy polyester resin was produced.

Another composition comprised the reaction product of 10 mole percent of maleic anhydride, 40 mole percent of adipic acid, and 50 mole percent of diethylene glycol.

*Example II*

A reaction product was prepared by reacting 30 mole percent of sebacic acid, 20 mole percent of maleic anhydride, and 50 mole percent of diethylene glycol under the same conditions as in Example I with a syrupy resin of low acid number resulting.

The unsaturated esters or alkyd resins of these two examples so prepared are dissolved in a monomeric compound having the group $H_2C=C<$, such as monostyrene or a simple substitution derivative of monostyrene, or a mixture of two or more monomers, as above described, to produce low viscosity, completely reactive solutions having present from 15% to 80% by weight of the unsaturated ester. Particularly good results have been obtained by dissolving the unsaturated esters in monostyrene to produce solutions containing from about 20% to 85% by weight of monostyrene and the balance, 80% to 15% by weight, composed of the unsaturated esters.

Such solutions are solvent reactive compositions that will polymerize completely when admixed with one or more vinyl-type polymerization catalysts, such as benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts, in an amount of from 0.5% to 5% and more, by weight. The proportion of the catalyst obviously may be present in amounts differing from these percentages.

In order to promote room temperature polymerization, we have found it necessary that there be included along with the catalyst a small amount of an accelerator, for example, from 0.01% to 2% of the weight of the composition. Suitable accelerators are nitrogen-carbon-hydrogen compounds selected from the group consisting of azomethine compounds, polyamino compounds, having at least one terminal primary amino group, and the aldehyde reaction products of such compounds. Reaction products of a primary aliphatic or aryl amine with an aldehyde in substantially stoichiometric proportions will produce the azomethine compounds. Thus benzaldehyde, butyraldehyde or furfural can be reacted in equimolar proportions with aniline, toluidine or ethylene diamine. The following are examples of suitable aliphatic polyamines within the scope of this invention: ethylene-diamine, N-($\beta$-hydroxyethyl)-ethylenediamine, 1,2-propylenediamine, diethylenetriamine, triethylenetetramine, $N^1$, $N^4$-dibutylidene-triethylenetetramine, N-monosalicylidene - diethylenetriamine, N,N'- disalicylidene - ethylenediamine, $N^1,N^3$-disalicylidene-diethylenetriamine, $N^1,N^4$-disalicylidene-triethylenetetramine, and the monosalicylidene and disalicylidene derivatives of the mixture of polyethylene polyamines obtained by condensing ethylene chloride with ammonia.

Aldehydes which may be reacted with aliphatic polyamines to produce promoters useful in this invention include aliphatic aldehydes such as formaldehyde, acetaldehyde, propionaldehyde, and butyraldehyde; unsaturated aldehydes such as crotonaldehyde and furfural; and aromatic aldehydes such as benzaldehyde, salicylaldehyde, and cinnamaldehyde. The amount of accelerator compound may be varied from 0.01% to 2% based on the weight of the resinous composition. The following example illustrates the preparation of a composition in accordance with the invention:

*Example III*

A polyester prepared by reacting diethylene glycol with a molar equivalent of maleic anhydride to an acid number of 50 was admixed with monostyrene in the ratio of 70 parts of the unsaturated polyester and 30 parts of monstyrene. To each 100 parts of the resulting solution there was added 2 parts of benzoyl peroxide, and 0.1 part of propylene diamine per 100 parts of solution were admixed. The composition containing the propylene diamine began to gel in about one hour. Ordinarily we prefer that the gel time be controlled to take place in approximately 1 to 3 hours. For this purpose, from 0.01 to 0.1 part of propylene diamine is sufficient.

Other accelerators or catalyzing promoters are metallic salts commonly employed as driers in the varnish industry. Examples thereof are a cobalt and lead naphthenates, oleates, linoleates, resinates, and other salts of organic acids. Tin chloride may be added to promote room temperature gelations of the resins. The following example illustrates this feature of the invention:

Example IV

The resin composition of Example II was dissolved in monostyrene to produce a solution composed of 35% by weight monostyrene and 65% of the polyester reaction product. Each 100 parts of the resulting solution by weight was admixed with three parts by weight of tertiary butyl hydroperoxide, 0.05 part by weight of cobalt naphthenate and 0.05 part of stannous chloride. The composition would gel in approximately one to two hours at 25° C.

Braided asbestos rope, one inch in diameter, was immersed for 10 minutes in the freshly prepared resinous composition of this Example IV. The impregnated rope was withdrawn from the solution, permitted to drain briefly, and was then pulled between all the top and bottom end windings of an alternating current generator. The rope ends overlapped a few inches when so peripherally drawn into place. The impregnated asbestos rope was then driven into place at the cross-over points of the upper and lower end windings. After having been driven into place, the asbestos rope was permitted to stand at room temperature over night. The next morning the rope was found to be completely thermoset into a hard, rigid block between each of the end windings into which it had been driven. The uncompressed, slightly larger diameter portions of the rope between the coils had also hardened into a rigid structure. A portion of the rope was removed from between the coils and tested for compression strength. Compression strength values of from 10,000 to 12,000 p. s. i. were reached before failure took place. The blocked end windings were found to be supported more adequately than possible with the use of solid formed spacers employed heretofore.

Since certain changes in carrying out the above process, and certain modifications in the article which embody the invention may be made without departing from its scope, it is intended that all matter contained in the above description or shown in the drawing shall be interpreted as illustrative and not in a limiting sense.

We claim as our invention:

1. In an electrical machine having a plurality of coils disposed in slots in a magnetic core, the coils having end windings projecting beyond said slots, in combination, means for blocking the end windings to enable them to withstand applied stresses, the blocking means comprising a rope member forced into and solidly filling the space between adjacent end windings, the rope member comprising a body of inorganic fibrous material and a thermoset resin impregnated into the fibrous material.

2. The machine of claim 1 wherein the rope member is impregnated with a thermoset resin derived from a liquid monomer having the group $H_2C=C<$ and an unsaturated polyester dissolved in the monomer, the polyester having the group $>C=C<$ reactive with the monomer and a catalyst promoting the polymerization of the liquid into a thermal solid.

3. An electrical machine comprising a magnetic core with a circular bore, a plurality of slots formed in the core and opening to the circular bore, two coils disposed in each slot with one coil being below the other with respect to the slot opening, a slot stick in each slot to hold the two coils therein tightly in position, each coil terminating in an end winding projecting beyond the core, the end windings of the upper coils diverging from the end windings of the lower coils in all the slots to provide a wedge-shaped space tapering toward the core, the wedge-shaped space being peripherally disposed concentric with the bore, blocking means driven into the wedge-shaped space to block the upper and lower coils with respect to each other, the blocking means comprising a long rope-like member disposed along the entire periphery of said wedge-shaped space, the rope-like member comprising a body of fibrous inorganic material and a thermoset resin impregnated into the fibrous material, the resin being derived from a solution comprising a liquid monomer having the group $H_2C=C<$, an unsaturated polyester having the group $>C=C<$ dissolved in the monomer, and a catalyst promoting the copolymerization of the monomer and the unsaturated ester.

4. In the method of blocking spaced apart end-windings of coils disposed in slots of a magnetic core, the steps comprising, impregnating a rope of an inorganic fibrous material, the rope normally being of a diameter larger than the space to be blocked, in a thermosettable resinous composition comprising essentially a liquid monomer having the group $H_2C=C<$, an unsaturated polyester having the group $>C=C<$ dissolved in the liquid monomer, and a catalyst promoting the copolymerization of the liquid monomer and the unsaturated ester at room temperature, and forcing the impregnated rope into the space, whereby the rope is compressed, and the liquid composition in the rope thermosets in several hours at room temperature.

5. A rope-like member comprising a body of inorganic fibers braided into a compact structure and a liquid completely reactive composition impregnated into the rope of inorganic fibers, the composition comprising essentially a liquid monomer having the group $H_2C=C<$, an unsaturated polyester having the group $>C=C<$, dissolved in the liquid monomer and a catalyst promoting the copolymerization of the liquid monomer and the unsaturated ester at room temperature, the catalyst comprising from 0.5% to 5% of peroxide vinyl type polymerization catalyst and from 0.01% to 2% of an accelerator to promote polymerization of the composition at room temperature.

MARVIN M. FROMM.
JOHN S. JOHNSON.

REFERENCES CITED

The following references are of record in the file of this patent:

UNITED STATES PATENTS

| Number | Name | Date |
|---|---|---|
| 2,437,990 | Askey | Mar. 16, 1948 |